United States Patent [19]

Takeuchi

[11] Patent Number: 5,123,629
[45] Date of Patent: Jun. 23, 1992

[54] SCREW-TYPE JACK
[75] Inventor: Masuo Takeuchi, Nagoya, Japan
[73] Assignee: Takeuchi Industrial Co., Ltd., Japan
[21] Appl. No.: 696,957
[22] Filed: May 8, 1991
[30] Foreign Application Priority Data Sep. 28, 1990 [JP] Japan .................... 2-102899[U]

[51] Int. Cl.$^5$ ........................... B66F 3/18
[52] U.S. Cl. ................. 254/103; 254/DIG. 4; 254/133 R; 254/100; 254/102
[58] Field of Search .............. 254/7 R, 98, 100, 102, 254/103, 133 R, DIG. 2, DIG. 4

[56] References Cited

U.S. PATENT DOCUMENTS

| | | |
|---|---|---|
| 538,392 | 4/1895 | Sheridan .................... 254/103 |
| 1,468,034 | 9/1923 | Riker ........................ 254/103 |
| 1,546,472 | 7/1925 | Butta ........................ 254/103 |
| 1,659,785 | 2/1928 | Rodman et al. ............ 254/103 |
| 2,600,741 | 6/1952 | Drum ....................... 254/DIG. 4 |
| 2,926,888 | 3/1960 | Schultz ..................... 254/DIG. 4 |
| 4,330,104 | 5/1982 | Klok ........................ 254/DIG. 4 |

Primary Examiner—J. J. Hartman
Attorney, Agent, or Firm—Leydig, Voit & Mayer

[57] ABSTRACT

A screw-type jack including an auxiliary screw barrel which is engaged with a ram cap at the uppermost stage. With that construction, this screw-type jack also has such function as to overlay an upper portion of a casing by the auxiliary screw barrel when the jack is contracted, in addition to widening the lift of the jack, whereby the case can be free from dirt and protected from damage.

3 Claims, 4 Drawing Sheets

SCREW-TYPE JACK

BACKGROUND OF THE INVENTION AND RELATED ART

The present invention relates to an improvement of a screw-type jack and, more particularly, to a screw-type which is provided with an auxiliary screw barrel to be screw-fitted with a supporting table in a known telescopic triple-stage jack, to thereby widen a range of the extended jack length when it lifts.

Conventionally, a jack used as a screw-type jack mainly for an automobile is mostly a so-called telescopic triple-stage jack in which both stage numbers of inner extension/contraction type jack means and outer expansion/contraction barrel means are three in total.

Also, of another type of jack which is provided with an auxiliary screw barrel is known. Because the auxiliary screw barrel is of a male screw type in shape and is positioned at the center of the jack (on the inner side of a ram), the jack is of a telescopic double-stage type.

However, the conventional telescopic triple-stage jack has a defect in that a lift of the jack suffers a restriction of extension due to its structure reason in relation to the same type jack having a jack presents a problem is that the jack is liable to be broken because of insufficiency of the lift, or damaged when used under an unfavorable condition owing to an excessiveness of the lift.

To eliminate this problem, there exists a jack (telescopic quadruple-stage jack) in which lengths of the lifts at the respective stages are substantially the same. This type of jack includes a number of complicated parts and is inferior in performance so that it cannot operate appropriately.

Further, the conventional jack has been set in suit at a jack-up point by rotating a smaller bevel gear, but the operation of the gear requires much labor and it is difficult to rotate the smaller bevel gear due to a gear ratio between the smaller and larger bevel gears.

SUMMARY OF THE INVENTION

In order to resolve the aforesaid problems, the instant invention is constructed as follows.

More particularly, in a screw-type jack of the invention, an auxiliary screw barrel having a supporting table at its uppermost end is screw-fitted on an outer peripheral portion of a ram cap which corresponds to a supporting table of a conventional telescopic triple-stage jack, an uppermost portion of a casing being overlaid with the auxiliary screw barrel when the jack is contracted.

BRIEF DESCRIPTION OF THE DRAWINGS

The drawings illustrate one preferred embodiment of a screw-type jack according to the invention.

DETAILED DESCRIPTION OF THE PREFERRED EMBODIMENT

Figure 1:
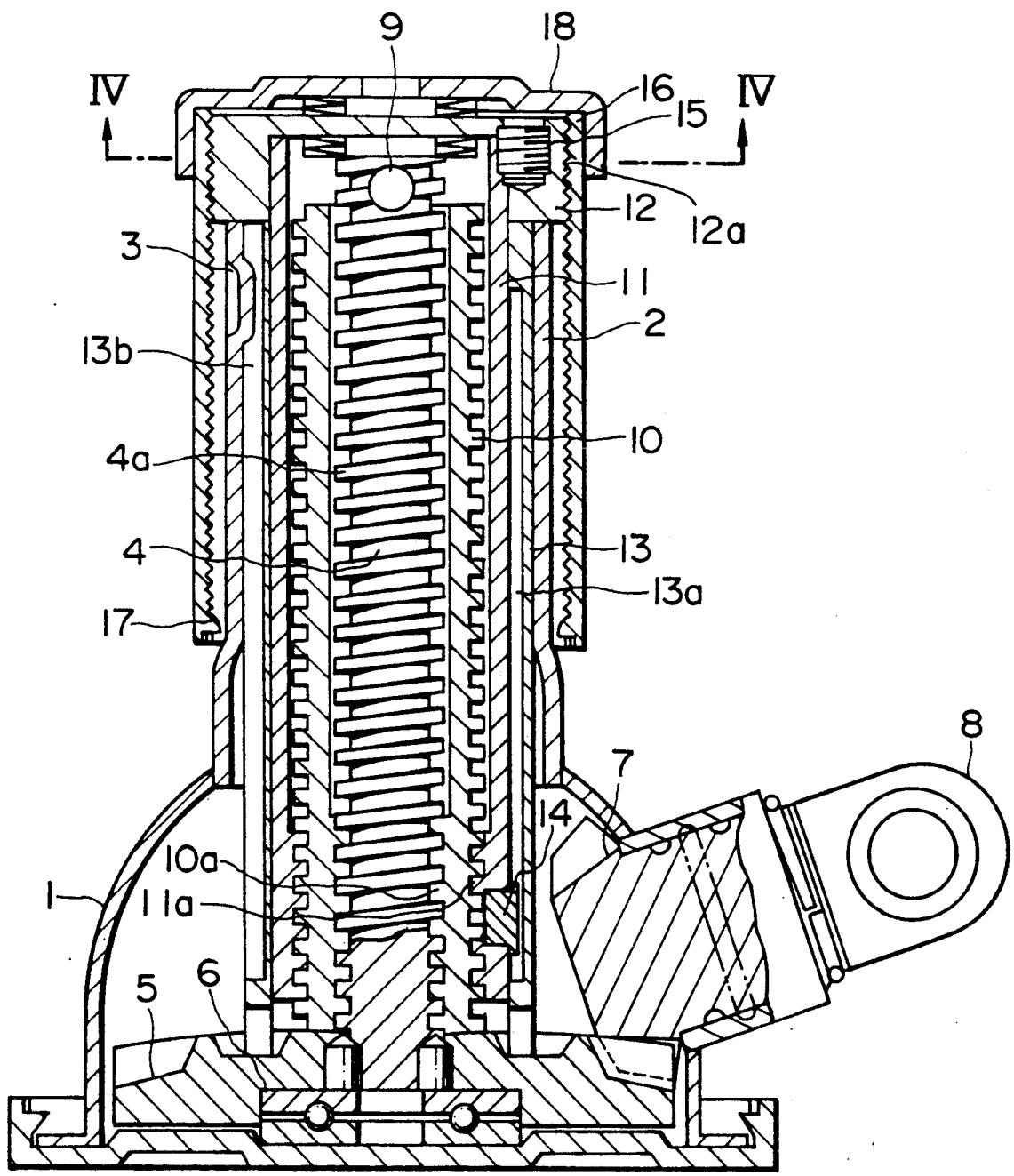
FIG. 1 is a longitudinally cross-sectional view showing a state that the jack is contracted.

One preferred embodiment of a screw-type jack according to the invention will be described in detail hereinafter, with reference to the accompanied drawings.

Reference numeral 1 designates a casing integrally formed with a casing cylinder 2 thereupon. There is provided on the upper portion of the casing cylinder 2, a casing key 3 which is protruded inwardly by press deforming. Reference numeral 4 is a screw rod including a male thread portion 4a on its outer periphery. A larger bevel gear 5 is rotatably connected to the lower end of the screw rod 4. The screw rod 4 is vertically provided at the center of the casing 1 with a thrust bearing 6 interposed between the lower end of the screw rod 4 and the bottom portion of the casing 1. And reference 7 is a smaller bevel gear which engages with the larger bevel gear 5, the smaller bevel gear 7 being integrally formed with an operation handle-joint 8 at the outer end thereof. Reference 10 shows a screw barrel formed with a female thread portion 10a on its lower inner peripheral surface, which female thread portion 10a is screw-fitted with the male thread portion 4a to thereby engage the screw rod 4 with the screw barrel 10. Additionally, reference 9 is a stopper pin for clogging the root of the male thread portion 4a at its upper end, the stopper pin 9 being studded there. Also, reference 10b is a male thread portion on the outer peripheral surface of the thread barrel 10. Then, reference numeral 11 denotes a ram formed with a female thread portion 11a on its lower inner peripheral surface which engages with the male thread portion 10b to thereby fit the screw barrel 10 in the ram 11. A ram cap 12 is securely fixed to the upper end of the ram 11 by means of three screw stoppers 15. The ram 11 is also provided with a ram key 14 on its outer peripheral surface at the lower end thereof. Further, reference numeral 13 is an outer ram which is slidably fitted on the outer surface of the ram 11, the outer ram 13 being provided with an inner guide groove 13a formed to extend from the lowermost end of the outer ram to a portion adjacent to the uppermost end of the outer ram 13 in parallel with the axial direction of the outer ram 13, and with an outer guide groove 13b formed to extend from the uppermost end of the outer ram 13 to a portion adjacent from the lowermost end of the outer ram 13 in parallel with the axial direction of the outer ram 13, respectively; the inner and outer guide grooves are located at different positions spaced from each other with an angular interval of 90°. The ram cap 12 at the upper end of the ram 11 corresponds to a known supporting table of a telescopic triple-stage jack in the prior art and is provided with a male thread portion 12a on its outer peripheral surface.

In assembling the screw-type jack according to the present invention the aforesaid ram key 14 is slidably fitted in the inner guide groove 13a, and the ram 11 is inserted into the outer ram 13 slidably therein in the axial direction. In succession with this, the casing key 3 is slidably fitted in the outer guide groove 13b, and the outer ram 13 is inserted into the casing barrel 2 slidably in the axial direction. In the present invention, an auxiliary screw barrel 16 to which a supporting table 18 is secured at its uppermost end is vertically slidably screw-fitted on the outer periphery of the ram cap 12, which corresponds to the known supporting table of the prior art telescopic triple-stage jack, owing to engagement between a female thread portion 16a of the auxiliary screw barrel 16 and the male thread portion 12a of the ram cap 12. Further, the auxiliary screw barrel 16 is arranged to overlay the upper portion of the casing 1 when the jack is contracted. Furthermore, the auxiliary screw barrel 16 is provided with a plurality of stopper claws 17 at its lower-end outer periphery by a coining process, for prevention of the auxiliary screw barrel 16 from being upwardly disconnected from the ram cap 12.

First operation in the state of contraction of the jack as shown in FIG. 1 is described. The rod 4 is rotated by a handle connected to the operation handle-joint 8 through a transmission mechanism consisting of the bevel gears 7 and 5. As a result, the screw barrel 10 engaged with the screw rod 4 and the ram 11 engaged with the screw barrel 10 are raised as one body with the sliding movement of the ram key 14 within the inner guide groove 13a of the outer ram 13. Then, under such condition that only the screw barrel 10 and the ram 11 reach at the lifted terminal position, when the screw rod 4 is further rotated, the female thread portion 10a engages with the stopper pin 9 so as to rotate the screw barrel 10 together with the screw rod 4 as one body. Accordingly, the ram 11 is successively raised and extended upwardly with respect to the screw barrel 10. At this time, the outer ram 13 is first raised by the ram key 14 to ascend and finally extend into a state shown in FIGS. 2 and 3, in which the telescopic triple-stage jack is completed to extend. However, according to the invention, the lift of the telescopic triple-stage jack is extended by manually rotating the auxiliary screw barrel 16 to thereby vertically move the barrel 16, which is effective in fine adjustment to set the jack in suit at a jack-up point.

Figure 2:
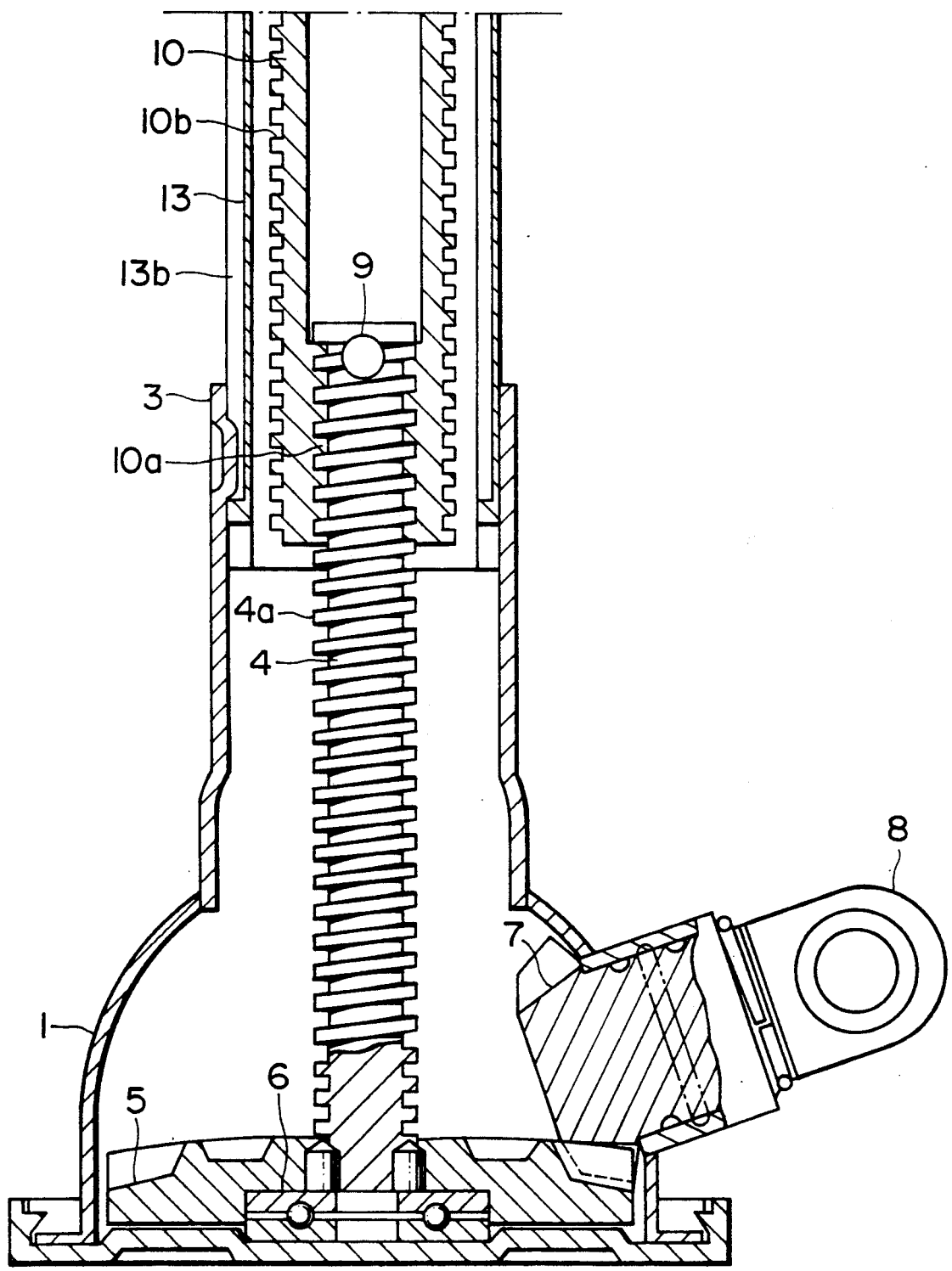
FIG. 2 is a longitudinally cross-sectional view illustrative of a lower portion of the jack in a state of being extended.
Figure 3:
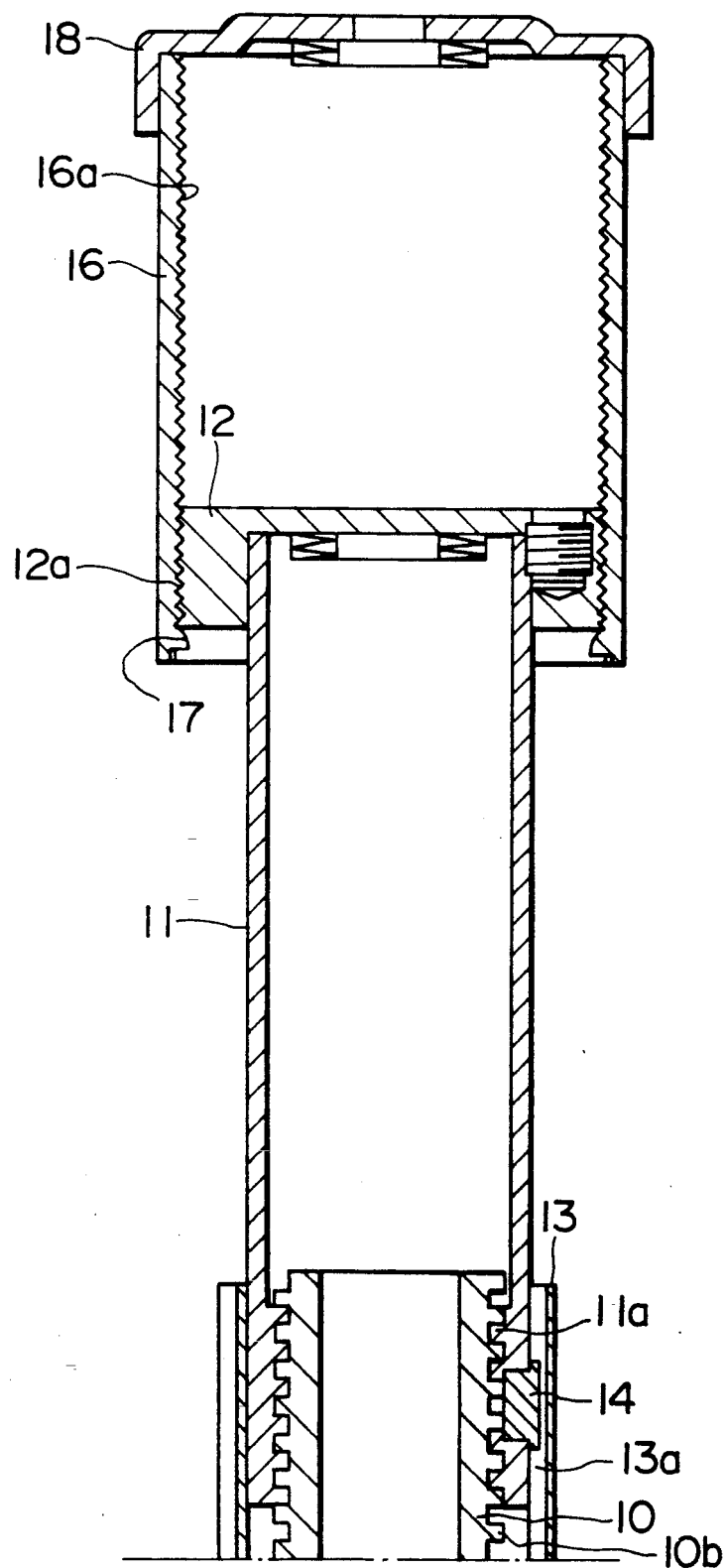
FIG. 3 is a longitudinally cross-sectional view illustrative of an upper portion of the jack in the state of FIG. 2.
Figure 4:
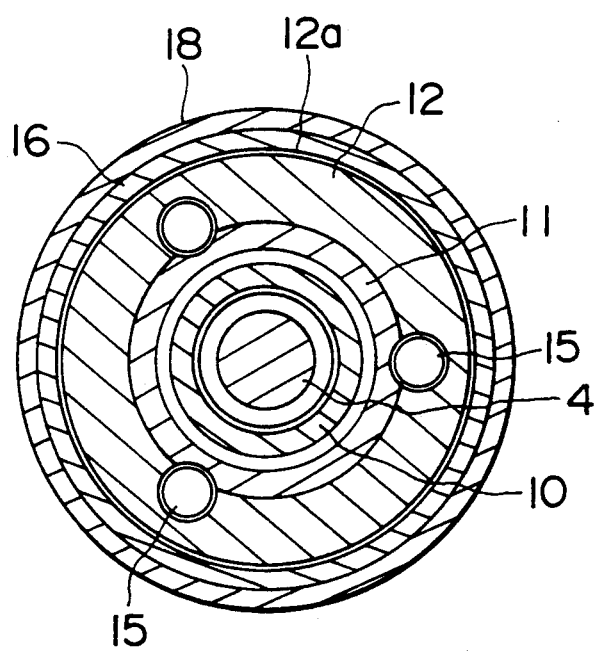
FIG. 4 is a cross-sectional view taken along IV—IV line in FIG. 1.

When the jack is contracted from the state that it is completed to extend as shown in FIGS. 2 and 3, the handle is rotated in the direction opposite to the case of extension so as to rotate the screw rod 4 in the reverse direction. Then, the screw barrel 10 and the ram 11 descend together as one body and the lower end of the screw barrel 10 collides to abut against the upper surface of the larger bevel gear 5. Further, when the screw rod 4 begins to rotate, the screw barrel 10 naturally rotates together with the screw rod 4 as one body. Successively, the ram 11 descends while the outer ram 13 descends concurrently. Finally, the jack is recovered to the contraction state or home position of FIG. 1 in which the jack is completely contracted.

As set forth so far, the screw-type jack according to the invention is arranged in such a manner that the auxiliary screw barrel including the supporting table at its upper end is screw-fitted on the outer peripheral portion of the ram cap corresponding to the known triple-stage jack supporting table, so that the utility range of the lift of this jack is more widened than the conventional telescopic triple-stage jack in which the contraction lengths at the respective stages are the same, whereby application flexibility of the screw-type jack is enhanced. Further, the screw-type jack of the invention possesses many advantages having such prominent effects that it can be protected from damage because the auxiliary screw barrel is used at need, although the conventional jack is often broken due to insufficiency of the lift or during use under the severe condition such as an excessiveness of the lift.

The number of parts in the screw-type jack of the invention is smaller than a jack of the telescopic quadruple-stage jack which does not employ the auxiliary screw barrel and has the same range of lift as that of the jack of the invention, and the former jack is simpler in construction and light in weight than the latter jack. The torque of the screw-type jack is smaller than the telescopic quadruple-stage jack and excellent in performance and advantageously economical.

Further, it is difficult to suitably set the conventional jack at a required jack-up point due to a gear ratio between the larger bevel gear and the smaller bevel gear because the smaller bevel gear is rotated in the conventional jack. The present invention includes a merit such that it can be rapidly set at the jack-up point in suit and readily contacted with the object to be jacked by the use of the auxiliary screw barrel. With respect to the amount of labor upon jacking operation, since the auxiliary screw barrel is used, there is an excellent effect which causes the jack to be operated in a low-torque wide range where the screw rod and the screw barrel are being engaged with each other.

Incidentally, with such construction that the auxiliary screw barrel overlays the upper portion of the casing when the jack is contracted, the jack of the invention and that the respective parts thereof are free from dirt or protected from damage when the jack is contracted.

Because the jacking levels of the front and rear vehicle frames of an automobile are different from each other, The movements of the jack required on the front and rear sides respectively are also different from each other. If a difference between the jacking levels becomes larger, the jack must be exposed under a hazard condition. On the contrary, the telescopic triple-stage jack according to the invention which employs the auxiliary screw barrel can be reliably used even in the same condition so that the problems in the prior art can be surely resolved.

What is claimed is:

1. A screw-type jack, comprising:
   a base;
   a case secured on said base and having a case barrel extending vertically;
   driving force transferring means provided on said base and in said case, for transferring force from outside said case;
   a rotatable screw rod with a male thread portion on its outer peripheral surface, said screw rod being disposed in said case and combined with said driving force transferring means;
   at least one extension barrel supported by said base, said extension barrel having a male thread portion on its outer peripheral surface and a female thread portion on it sinner peripheral surface engaged with a male thread portion of said outer peripheral surface of said screw rod;
   a ram having a female thread portion on its inner peripheral surface engaged with said male thread portion on the outer peripheral surface of said extension barrel, which, in turn is engaged with said screw rod;
   a ram cap secured on the upper end of said ram; and
   an auxiliary screw barrel which has a support table secured at an uppermost end, said auxiliary screw barrel being connected to said ram cap to permit extension of said support table from said upper ram end and thereby extend the effective height of the jack, and said auxiliary screw barrel covers a portion of said case barrel when said jack is contracted.

2. A screw-type jack according to claim 1, where said auxiliary screw barrel includes at its lower end portion stopping means for prevention the same from being disconnected from said ram cap.

3. A screw-type jack according to claim 2, where said stopping means are stopper claws.

* * * * *

UNITED STATES PATENT AND TRADEMARK OFFICE
CERTIFICATE OF CORRECTION

PATENT NO. : 5,123,629

DATED : June 23, 1992

INVENTOR(S) : Masuo Takeuchi

It is certified that error appears in the above-identified patent and that said Letters Patent is hereby corrected as shown below:

Claim 1, Column 4, line 54, change "it sinner" to

--its inner--.

Signed and Sealed this

Thirty-first Day of August, 1993

Attest:

BRUCE LEHMAN

Attesting Officer

Commissioner of Patents and Trademarks